United States Patent [19]

Morris, II et al.

[11] Patent Number: 4,844,927
[45] Date of Patent: Jul. 4, 1989

[54] STORAGE TANK ASSEMBLY FOR BULK FAT AND METHOD FOR USING SAME

[75] Inventors: Robert D. Morris, II, Dallas Center; Richard W. Murphey, Des Moines; David K. Swanton, Goose Lake, all of Iowa

[73] Assignee: National By-Products, Inc., Des Moines, Iowa

[21] Appl. No.: 209,562

[22] Filed: Jun. 20, 1988

[51] Int. Cl.[4] .......................... A23K 1/00; F24H 1/18; A23P 1/00
[52] U.S. Cl. .................................... 426/307; 426/623; 426/630; 426/635; 426/636; 219/312; 219/306; 99/646 C
[58] Field of Search ............... 426/307, 623, 630, 635, 426/636; 219/310, 312, 306; 99/646 C

[56] References Cited

U.S. PATENT DOCUMENTS

| | | |
|---|---|---|
| 591,783 | 10/1897 | McClellan . |
| 1,233,796 | 7/1917 | Lyche . |
| 1,343,848 | 6/1920 | Rice . |
| 2,721,928 | 10/1955 | Boydstun .............................. 219/38 |
| 2,730,607 | 1/1956 | Tillison ................................ 219/38 |
| 3,546,429 | 4/1969 | Fleet et al. ........................ 219/312 |
| 4,135,552 | 1/1979 | Mendolia ............................ 138/30 |
| 4,403,137 | 9/1983 | Glazer ................................ 219/306 |

Primary Examiner—Marianne Cintins
Attorney, Agent, or Firm—Zarley, McKee, Thomte, Voorhees & Sease

[57] ABSTRACT

The present invention comprises an enclosed tank for containing fat. The bottom wall is cone shaped and at the lower end of the cone is an outlet opening. A valve is placed in the opening to permit fluid to be added to or drained from the tank. A heater element is placed in the bottom of the tank and can be either an electrical heated element or a helical tube containing steam or hot water. A circulation system permits the removal of fat from the bottom of the tank and the recirculating of the fat to the upper portion of the tank. A valve within the recirculation system permits the fat to be pumped to a spray nozzle where it can be sprayed onto a feed mixture for animals.

9 Claims, 2 Drawing Sheets

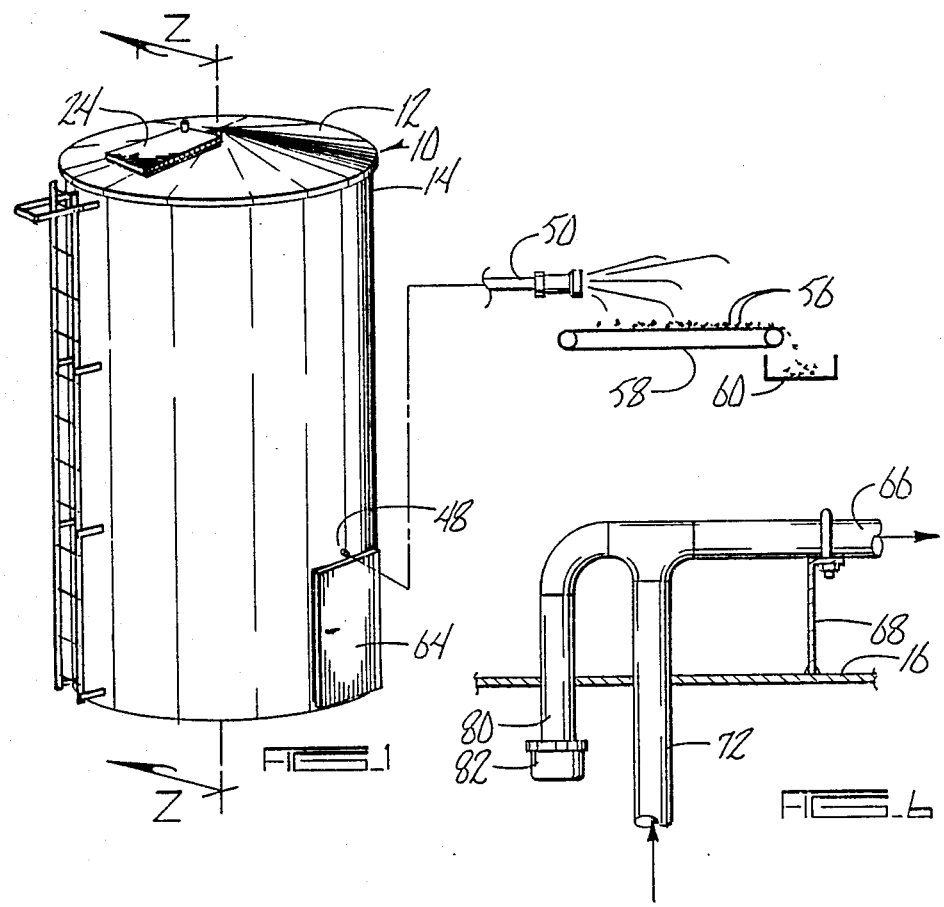
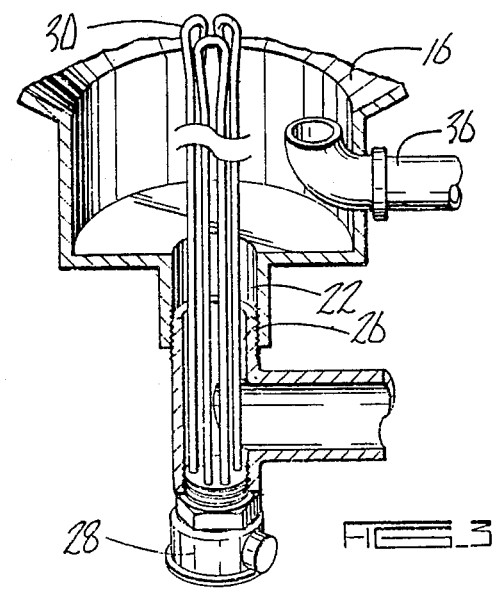

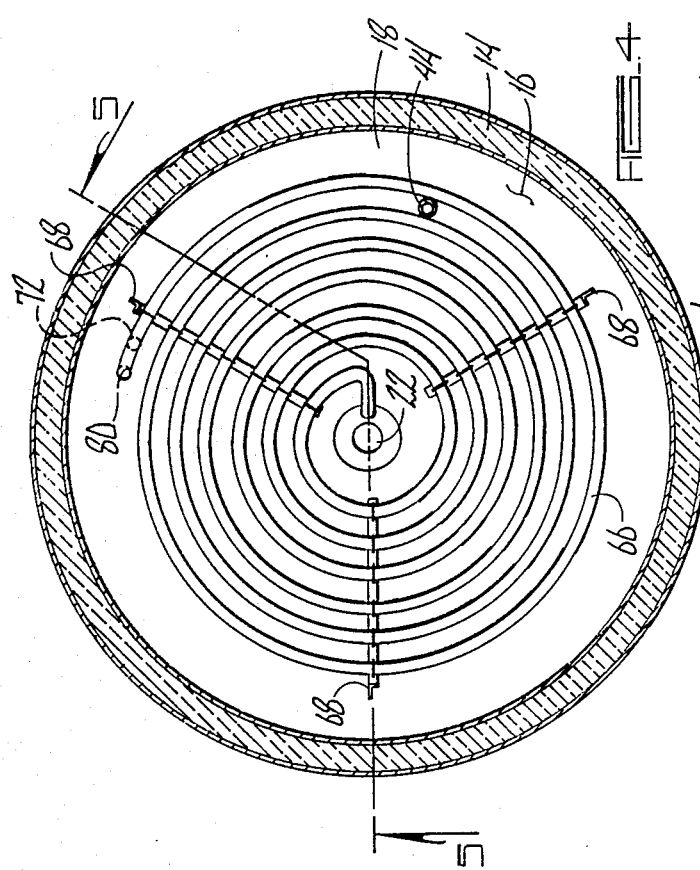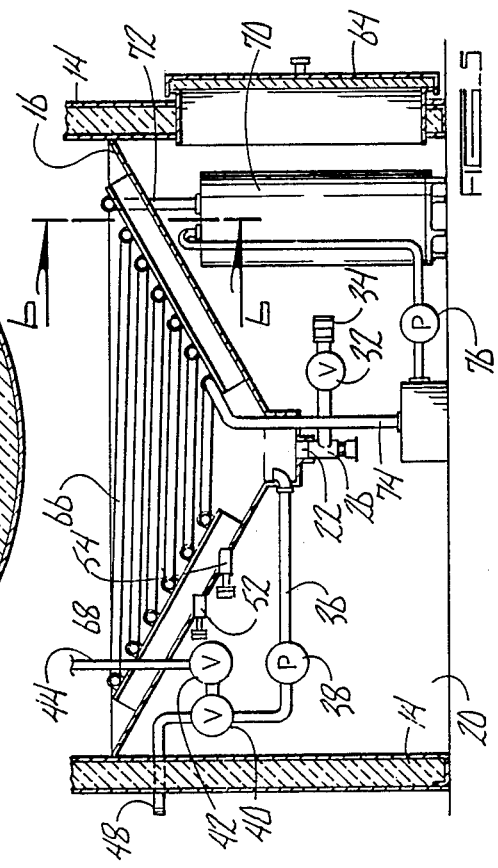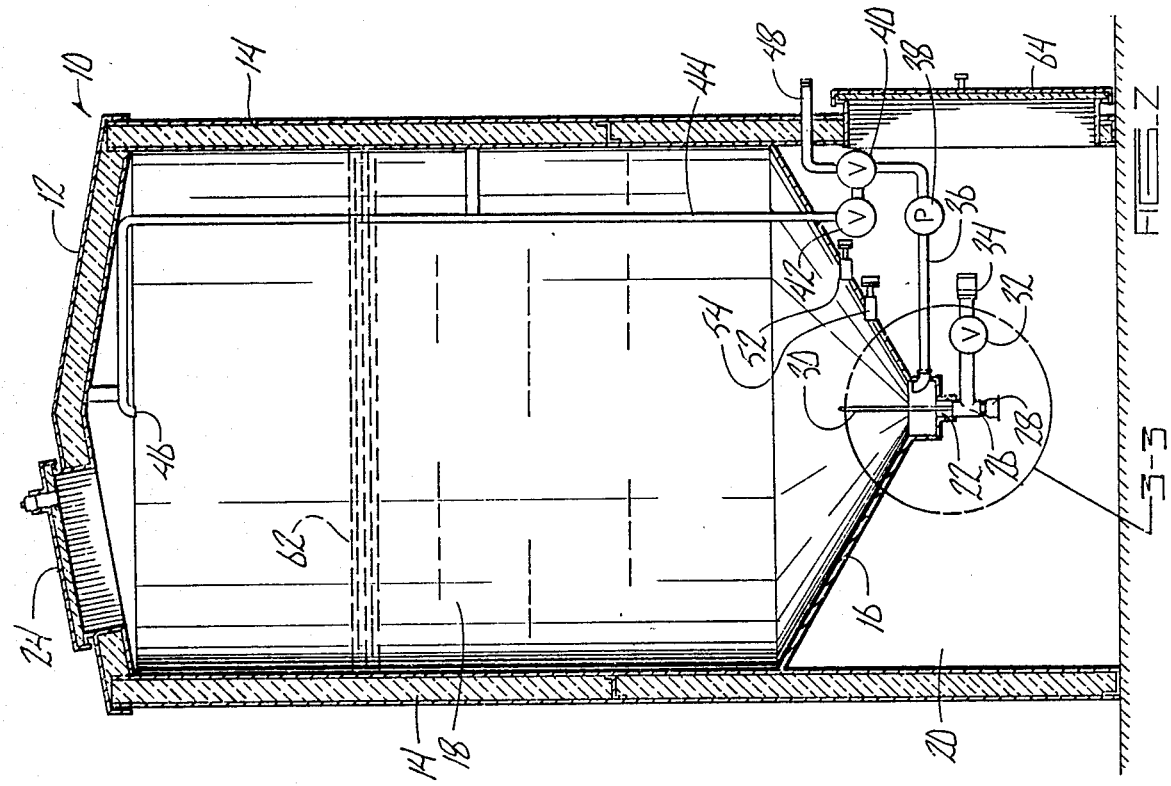

STORAGE TANK ASSEMBLY FOR BULK FAT AND METHOD FOR USING SAME

BACKGROUND OF THE INVENTION

This invention relates to a storage tank assembly for bulk fat and method for using same.

In the preparation of feed mixtures for livestock, farmers often find it desirable to spray animal fat on the feed to provide higher energy content to the feed when it is fed to the animals. This enhances the weight gain of the animals.

Fat by its nature tends to become solid at temperatures below 90 degrees Fahrenheit. Therefore, it is necessary to heat the fat so that it is in a liquid state and can be sprayed on the animal feed. Ideally the fat should be at approximately 120 degrees Fahrenheit for spraying.

Considerable difficulty is encountered in attempting to heat the fat to the desired temperature. Most heating devices are too hot and cause the fat to burn or "carmelize" and form a layer on the heating element. Sometimes fire can result. Furthermore, unless the fat is evenly heated its quality can be reduced.

Therefore, a primary object to the present invention is the provision of an improved storage tank assembly for bulk fat and method for using the storage tank to heat the fat and spray the fat on the animal feeds.

A further object of the present invention is the provision of a storage tank assembly which maintains the fat in a liquid state so that it is ready to spray at the time the farmer needs the spray.

A further object of the present invention is the provision of a storage tank assembly which includes means for recirculating the fat during the time that it is stored.

A further object of the present invention is the provision of a storage tank assembly which can easily be refilled and which can provide easy access to the fat for spraying on animal feeds.

A further object of the present invention is the provision of a storage tank assembly and method for using same which is economical to manufacture, durable in use, and efficient in operation.

A further object of the present invention is to provide uniform heating and melting of the fat.

A further object of the present invention is to eliminate the burning of the fat resulting from a heating element which is too hot.

A further object of the present invention is to reduce the danger of fire.

A further object of the present invention is to reduce the dust which occurs in the feed by spraying the fat on the feed.

SUMMARY OF THE INVENTION

The storage tank of the present invention includes an upstanding tank having a top wall, side walls, and a tapered bottom wall. The tapered bottom wall tapers downwardly to a low point in the tank, and includes an outlet opening at that lowest point. Valve means are provided in the outlet opening for permitting fat to be added to or taken out of the tank.

A heater element is provided in the lower end of the tank, and can be an electrical heater element or a hot water or steam coil positioned adjacent the bottom wall of the tank.

The heater of the present invention differs from prior hot water heater elements in that it remains at a much lower temperature than conventional hot water heater elements. A thermostat prevents the heater from exceeding 300-500 degrees Fahrenheit so that the fat will not burn. If the probe were to get as hot as most water heater probes it wold burn the fat which will then cake on the heater and cause it to ultimately burn out.

A recirculation system is provided which includes a first conduit in communication with the interior of the tank adjacent the lower end thereof. The conduit is connected to a pump which in turn is connected to a recirculation conduit extending upwardly to the upper end of the tank. When the pump is actuated it draws fat from the bottom of the tank and recirculates it to the top of the tank. The recirculation system helps maintain uniform heating of the fat and reduces the likelihood of overheating of the fat immediately adjacent the heater probe.

A removal conduit is also connected to the bottom of the tank and includes a valve which can be opened to cause the fat to be pumped through the removal conduit to a spray where it can be sprayed onto the animal feed.

BRIEF DESCRIPTION OF THE DRAWINGS

FIG. 1 is a perspective view of the tank of the present invention showing the spraying apparatus schematically.

FIG. 2 is a sectional view taken along line 2—2 of FIG. 1.

FIG. 3 is an enlarged perspective detail taken along line 6—6 of FIG. 2.

FIG. 4 is a plan sectional view showing a modified form of the present invention.

FIG. 5 is a sectional view taken along line 5—5 of FIG. 4.

FIG. 6 is a sectional view taken along line 6—6 of FIG. 5.

DETAILED DESCRIPTION OF THE PREFERRED EMBODIMENT

Referring to FIGS. 1 and 2 of the drawings, the numeral 10 generally designates the tank assembly of the present invention. Assembly 10 comprises a top wall 12, a circular side wall 14, and a cone shaped bottom wall 16 which define a chamber 18. Side walls 14 and top wall 12 are insulated so as to minimize the escape of heat from chamber 18. Side walls 14 extend downwardly a substantial distance below bottom wall 16 so as to support bottom wall 16 in upward spaced relation from a supporting surface, thereby creating a compartment 20 below bottom wall 16.

At the lower most point of bottom wall 16 is an outlet opening 22. The top wall 12 of tank assembly 10 includes a vent 24 which permits the escape of gases from the upper end of chamber 18.

Referring to FIG. 3, a T-conduit 26 is threaded within outlet 22 and contains therein a heater probe 28 having three electrical heater elements 30 extending upwardly therefrom into the interior of chamber 18. T-conduit 26 also includes a drain valve 32 therein which is normally closed to prevent fat from draining out of the chamber 18. A coupler 34 is connected to valve 32 and is adapted to be connected to a source of fat for filling the tank. For example, a delivery truck can be used to deliver the fat to the site of the tank, and can be coupled to couple 34. Then valve 32 is opened and the fat can be pumped into the chamber 18 through outlet opening 22. Valve 32 can also be used to drain the contents from tank 18.

Heater probe 28 is preferably a 3,000 watt heater which normally reaches a maximum temperature of approximately 300 degrees Fahrenheit. This is to be distinguished from electrical heater probes commonly used in hot water tanks which usually often reach temperatures of 1,000 degrees Fahrenheit. It is preferable that the heater probe not exceed 300 to 500 degrees Fahrenheit because fat burns at a temperature of between 300 and 500 degrees Fahrenheit and it is desirable to avoid any burning of the fat.

Also, in communication with chamber 18 adjacent the lowest point thereof, is a recirculation conduit 36 which in turn is connected to a pump 38, a three-way removal or sprayer valve 40, and a back pressure valve 42. Extending upwardly from back pressure valve 42 is an upstanding conduit 44 which has a recirculation outlet 46 at the upper end thereof.

Removal or sprayer valve 40 is connected to a removal conduit 48 which leads to a spray nozzle 50 (FIG. 1).

A thermostat 52 and a temperature gauge 54 are inserted into bottom wall 16 and are adapted to sense the temperature of the fat within chamber 18. The thermostat 52 is electrically connected to the heater probe 28 so as to control the actuation and deactuation of the heater probe 28 in response to the temperature of the fat which the thermostat senses within the chamber 18. Thermostat 52 helps keep the probe at a temperature of from 300-500 degrees Fahrenheit so that the fat will not burn.

In operation, the thermostat 52 causes the heater probe 28 to be actuated thereby causing heater element 30 to heat the fat within chamber 18. When the fat reaches the desired temperature (preferably between 100 and 160 degrees Fahrenheit) the thermostat 52 causes the heater probe to turn off, but it reactuates the heater probe in the event that the temperature of the fat drops below a predetermined level. When it is desired to apply the fat to animal feed, valve 40 is opened thereby providing access from conduit 36. Actuation of pump 38 causes fat to be pumped from the bottom of chamber 18 through conduit 36 valve 40 and conduit 48 to nozzle 50. The back pressure valve 42 prevents the fat from being pumped upwardly through conduit 44 whenever valve 40 is open. The fat is then sprayed onto the animal feed 46 which can then be conveyed by any suitable conveyor 58 to a feed container or bin 60.

After the spraying operation has been complete, valve 40 is closed so as to prevent fluid from passing into removal conduit 48. In this position valve 40 permits fat to be pumped upwardly through back pressure valve 42, conduit 44 and outwardly through outlet 46. This causes the fat to be circulated from the bottom of the tank and redeposited at the top of the tank. As can be seen in FIG. 2, a hardened or solidified layer 62 of fat often forms at the top of the fat reservoir within chamber 18. However, by continually recirculating the fat from the bottom of the tank to the top it is possible to maintain the fat in a substantially well mixed and liquid condition. This also prevents the bridging of the solidified layer 62 since the weight of the fat being deposited on the top of the layer 62 causes it to fall and be melted as it is pressed downwardly toward heater elements 30.

An access door 64 is provided in side wall 14 so that it is possible to gain access to compartment 20 and operate the valves or make repairs to the various components below wall 16.

FIGS. 4, 5 and 6 show a modified form of the invention. Many of the components are identical to the components shown in FIGS. 1-3, and therefore the same numerals are used to designate corresponding parts. Instead of using the electrical heater probe 28, a helical coiled tube 66 is positioned adjacent bottom wall 16. Tube 66 is helically shaped and is mounted upon support brackets 68 which rest upon the cone shaped bottom wall 16. Tube 66 is connected to a hot water heater tank 70 within compartment 20. Leading from tank 70 is a hot water pipe 72 (FIG. 6) which is connected to helical tube 66 at the upper end thereof. At the lower end of tube 66 is a return conduit 74 which extends downwardly to a pump 76 which in turn is connected to heater tank 70. Thus, the hot water, or if desired, steam, can be pumped upwardly through pipe 72 to coil 66 and then downwardly through pipe 74 and pump 76 to the tank 70 again. It is possible to use either hot water or steam in this system. Preferably the temperature within the tube 66 is approximately 160 degrees Fahrenheit and this will maintain the fat at a temperature of approximately 120 degrees Fahrenheit which is preferred. The fat will begin to set up at approximately 90 degrees Fahrenheit, and therefore it is desirable to keep the fat above that temperature.

Referring to FIG. 6 a bleed off stem 80 is connected to the upper end of pipe 72 and includes a removable cap 82, which when removed permits the bleeding of trapped air from the pipe 72 and the coil 66.

The present invention provides a simple means for storing the fat and for maintaining it in a liquid state so that it can be sprayed on the grain at the desired time. The placing of the heater probe 28 at the lowest point in the tank permits the heating of the fat at this critical point so that it can be drained away. Furthermore, by recirculating the fat it is possible to overcome any bridging effect which occurs at 62, since they weight of the recirculated fat will cause the bridged hardened layer 62 to break and fall downwardly where it will be melted and liquified. Thus, it can be seen that the device accomplishes at least all of its stated objectives.

What is claimed is:

1. A storage tank assembly for bulk fat comprising:
   an upstanding tank having a top wall, side walls and a bottom wall defining a tank chamber for containing said fat, said bottom wall tapering downwardly to an outlet opening located at the lowest point within said chamber for permitting said fat to drain outwardly through said outlet opening by gravity;
   first valve means movable between a closed position preventing said fat from exiting said chamber through said outlet opening and an open position permitting said fat to exit said chamber through said outlet opening;
   heater means within said chamber adjacent said bottom wall of said tank, said heater means being capable of heating said fat to a temperature of between 100 degrees Fahrenheit and 160 degrees Fahrenheit;
   a recirculation circuit comprising a first conduit in communication with the interior of said chamber adjacent said lowest point thereof, a second conduit connected to said first conduit and having a recirculation outlet within said chamber adjacent the upper end thereof and pump means within said recirculation circuit for pumping said fat adjacent said lowest point of said chamber upwardly through said first and second conduits and outwardly through said recirculation outlet adjacent said upper end of said chamber;

a fat removal conduit in communication with said recirculation circuit;

a sprayer valve within said removal conduit and movable from a closed position preventing fat from passing through said removal conduit to an open position permitting said fat to pass through said removal conduit;

temperature control means having a temperature sensing means with said chamber for sensing the temperature of said fat within said chamber, said temperature control means being connected to said heater means for causing said heater means to maintain said fat within said chamber between 100 degrees Fahrenheit and 160 degrees Fahrenheit.

2. A storage tank assembly according to claim 1 where said heater means comprises a tubular coil within said chamber adjacent said bottom wall, and supply means for supplying heated water to said tube at a temperature sufficient to cause said fat within said chamber to be between 100 degrees Fahrenheit and 160 degrees Fahrenheit.

3. A storage tank assembly according to claim 2 wherein said supply means comprises a hot water heater and a water pump for circulating hot water from said heater to said tubular coil.

4. A storage tank according to claim 2 wherein said tubular coil includes a plurality of helical revolutions and follows a path adjacent to said tapered bottom wall.

5. A storage tank according to claim 1 wherein said heater means comprises an elongated electrical probe having a lower end attached to said bottom wall adjacent said lowest point thereof and having an upper end extending upwarding into said chamber, said electrical probe being electrically actuatable to heat said fat within said chamber.

6. A storage tank assembly according to claim 1 wherein said side walls of said tank extend downwardly below said bottom wall so as to define a compartment below said bottom wall, said pump means, said first valve means, and said sprayer valve being within said compartment.

7. A storage tank assembly according to claim 3 wherein said side walls of said tank extend downwardly below said bottom wall so as to define a compartment below said bottom wall, said pump means, said first valve means, said sprayer valve and said hot water heater being within said compartment.

8. A storage tank assembly according to claim 7 wherein said top wall includes vent means therein for permitting the escape of gases from said chamber.

9. A method for using a storage tank assembly to apply fat to animal feed, said storage fat assembly comprising an upstanding tank having a top wall, side walls and a bottom wall tapering downwardly to an outlet opening located at the lowest point within said chamber for permitting said fat to drain outwardly through said outlet opening by gravity; first valve means movable between a closed position preventing said fat from exiting said chamber through said outlet opening and an open position permitting said fat to exit said chamber through said outlet opening; heater means within said chamber adjacent said bottom wall of said tank, said heater means being capable of heating said fat to a temperature of between 100 degrees Fahrenheit and 160 degrees Fahrenheit; a recirculation circuit comprising a first conduit in communication with the interior of said chamber adjacent said lowest point thereof, a second conduit connected to said first conduit and having a recirculation outlet within said chamber adjacent the upper end thereof and pump means within said recirculation circuit for pumping said fat adjacent said lowest point of said chamber upwardly through said first and second conduits and outwardly through said recirculation outlet adjacent said upper end of said chamber; a fat removal conduit in communication with said recirculation circuit; a sprayer valve within said removal conduit and movable from a closed position preventing fat from passing through said removal conduit to an open position permitting said fat to pass through said removal conduit; temperature control means having a temperature sensing means with said chamber for sensing the temperature of said fat within said chamber, said method comprising:

placing bulk fat within said chamber;

heating said bulk fat with said heater means until said fat reaches a temperature of from 100 degrees Fahrenheit to 160 degrees Fahrenheit whereupon said fat is in a liquid state;

recirculating said fat from bottom point of said tank through said recirculation circuit through said recirculation outlet at said top of said tank;

opening said sprayer valve to its said open position whereby said fat will be directed through said fat removal conduit;

spraying said fat from said fat removal conduit onto said animal feed.

* * * * *